United States Patent
Beaurepaire

(10) Patent No.: US 9,706,349 B2
(45) Date of Patent: Jul. 11, 2017

(54) METHOD AND APPARATUS FOR PROVIDING AN ASSOCIATION BETWEEN A LOCATION AND A USER

(71) Applicant: HERE Global B.V., Veldhoven (NL)

(72) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/871,297

(22) Filed: Sep. 30, 2015

(65) Prior Publication Data

US 2017/0094455 A1   Mar. 30, 2017

(51) Int. Cl.
| | |
|---|---|
| H04W 24/00 | (2009.01) |
| H04W 4/02 | (2009.01) |
| H04W 8/18 | (2009.01) |
| H04W 64/00 | (2009.01) |

(52) U.S. Cl.
CPC ............ H04W 4/02 (2013.01); H04W 8/183 (2013.01); *H04W 64/00* (2013.01)

(58) Field of Classification Search
CPC ....... H04W 4/02; H04W 48/04; H04W 64/00; H04W 8/183
USPC .................. 455/456.3, 456.6, 456.5, 457
See application file for complete search history.

(56) References Cited

U.S. PATENT DOCUMENTS

| | | | |
|---|---|---|---|
| 8,000,726 B2 * | 8/2011 | Altman ............. | G06Q 30/0207 455/456.1 |
| 8,185,132 B1 | 5/2012 | Katpelly et al. | |
| 8,412,695 B2 | 4/2013 | Bhide et al. | |
| 8,521,680 B2 | 8/2013 | Lin | |
| 8,725,175 B2 * | 5/2014 | Altman ............. | G06Q 30/0207 455/435.1 |
| 2005/0197767 A1 * | 9/2005 | Nortrup ............ | G01C 21/3667 701/420 |
| 2008/0280600 A1 | 11/2008 | Zhou | |
| 2012/0191777 A1 | 7/2012 | Iwasaki et al. | |
| 2012/0208559 A1 * | 8/2012 | Svendsen ............ | G01C 21/362 455/456.2 |
| 2012/0331137 A1 * | 12/2012 | Olsen ..................... | G06Q 30/02 709/224 |
| 2013/0232436 A1 * | 9/2013 | Wei ....................... | G06F 3/0484 715/771 |
| 2014/0163861 A1 * | 6/2014 | Beaurepaire ........... | G06Q 10/00 701/400 |
| 2014/0256358 A1 | 9/2014 | Hawkins et al. | |
| 2014/0378162 A1 | 12/2014 | Shatsky et al. | |

(Continued)

FOREIGN PATENT DOCUMENTS

JP   2010236858 A   10/2010

*Primary Examiner* — Khai M Nguyen
(74) *Attorney, Agent, or Firm* — Ditthavong & Steiner, P.C.

(57) ABSTRACT

An approach is provided for assigning at least one location to at least one contact associated with at least one device and/or at least one vehicle. The approach involves monitoring at least one device, one or more communications between at least one user and at least one contact of the at least one user. The approach also involves processing and/or facilitating a processing of sensor information associated with the at least one device, the at least one user, the at least one contact, or a combination thereof to determine location information. The approach further involves updating or recommending an update of at least one contact record for the at least one contact based, at least in part, on the location information.

20 Claims, 16 Drawing Sheets

(56) References Cited

U.S. PATENT DOCUMENTS

2015/0073708 A1    3/2015  Mishra
2015/0120183 A1*   4/2015  Annapureddy .... G01C 21/3688
                                                          701/430
2016/0014567 A1*   1/2016  Arney-Cimino ...... H04W 4/028
                                                          455/456.3

* cited by examiner

START → 301 MONITOR AT A DEVICE, COMMUNICATIONS BETWEEN A USER AND A CONTACT OF THE USER → 303 PROCESS AND/OR FACILITATE A PROCESSING OF SENSOR INFORMATION ASSOCIATED WITH THE DEVICE AND/OR THE USER AND/OR THE CONTACT TO DETERMINE LOCATION INFORMATION → 305 UPDATE OR RECOMMEND AN UPDATE OF A CONTACT RECORD FOR THE CONTACT BASED ON THE LOCATION INFORMATION → END

START → DETERMINE POTENTIAL CONTACTS BASED ON THE COMMUNICATIONS AND/OR THE SENSOR INFORMATION AND/OR THE LOCATION INFORMATION, OR CONTEXTUAL INFORMATION (401) → PRESENT THE POTENTIAL CONTACTS TO THE USER ON A USER INTERFACE (403) → RANK OR FILTER THE POTENTIAL CONTACTS BASED ON ONE OR MORE CRITERIA (405) → END

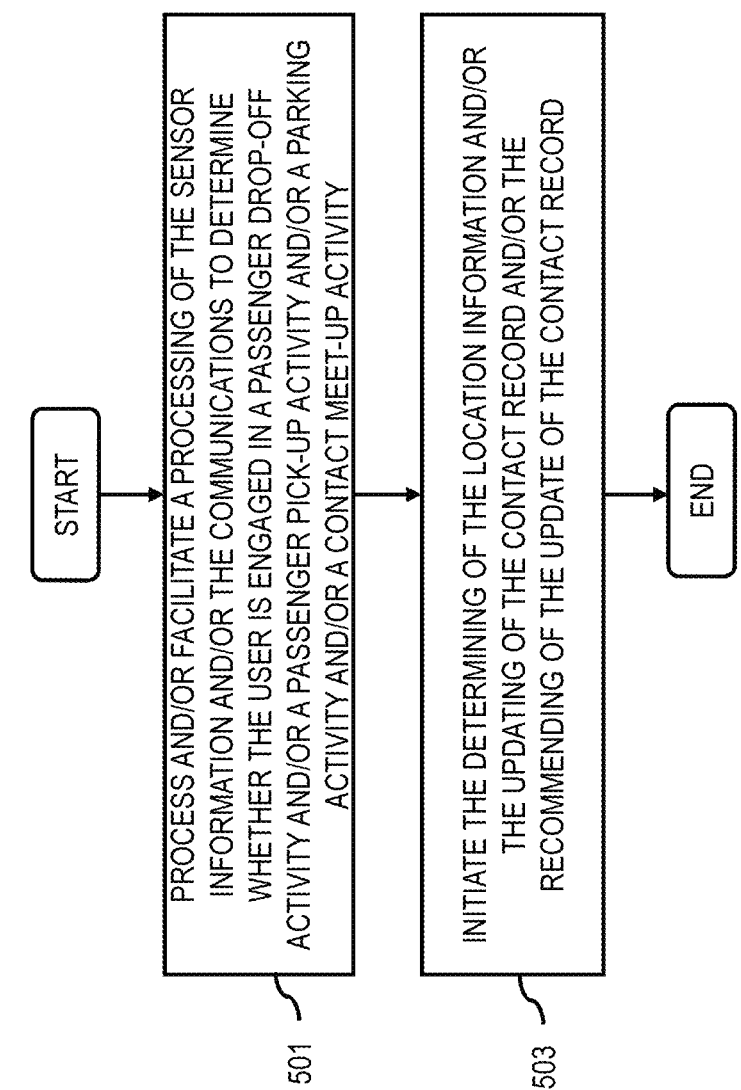

600

START → 601 PRESENT THE USER INTERFACE TO THE USER FOR CONFIRMING AND/OR REFINING THE LOCATION INFORMATION → 603 PROCESS AND/OR FACILITATE A PROCESSING OF THE LOCATION INFORMATION AND/OR THE COMMUNICATIONS AND/OR THE SENSOR INFORMATION AND/OR THE CONTEXTUAL INFORMATION TO DETERMINE LOCATION REFINEMENT OPTIONS → 605 PRESENT ONE OR MORE REFINEMENT OPTIONS IN THE USER INTERFACE → END

FIG. 6

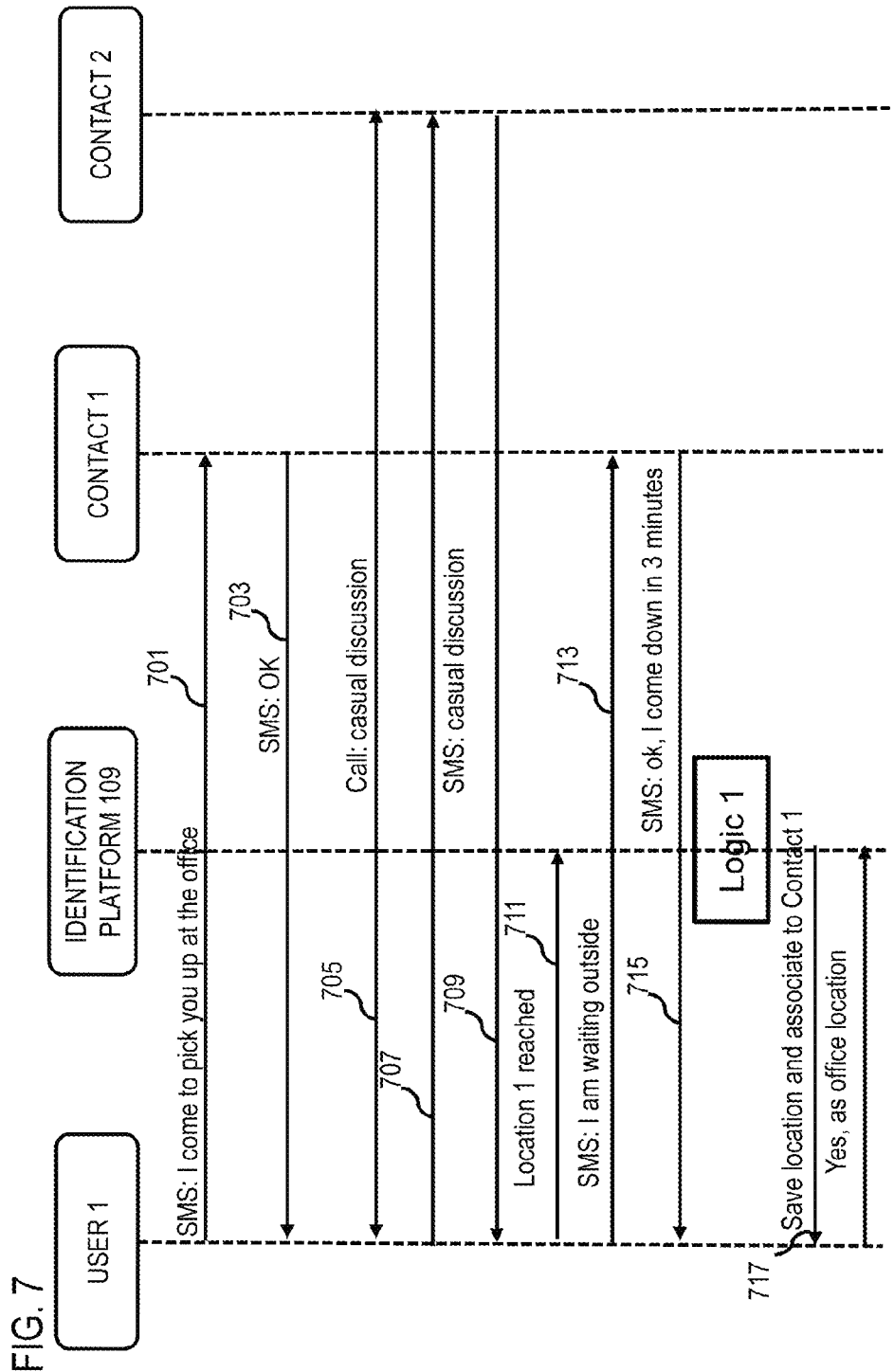

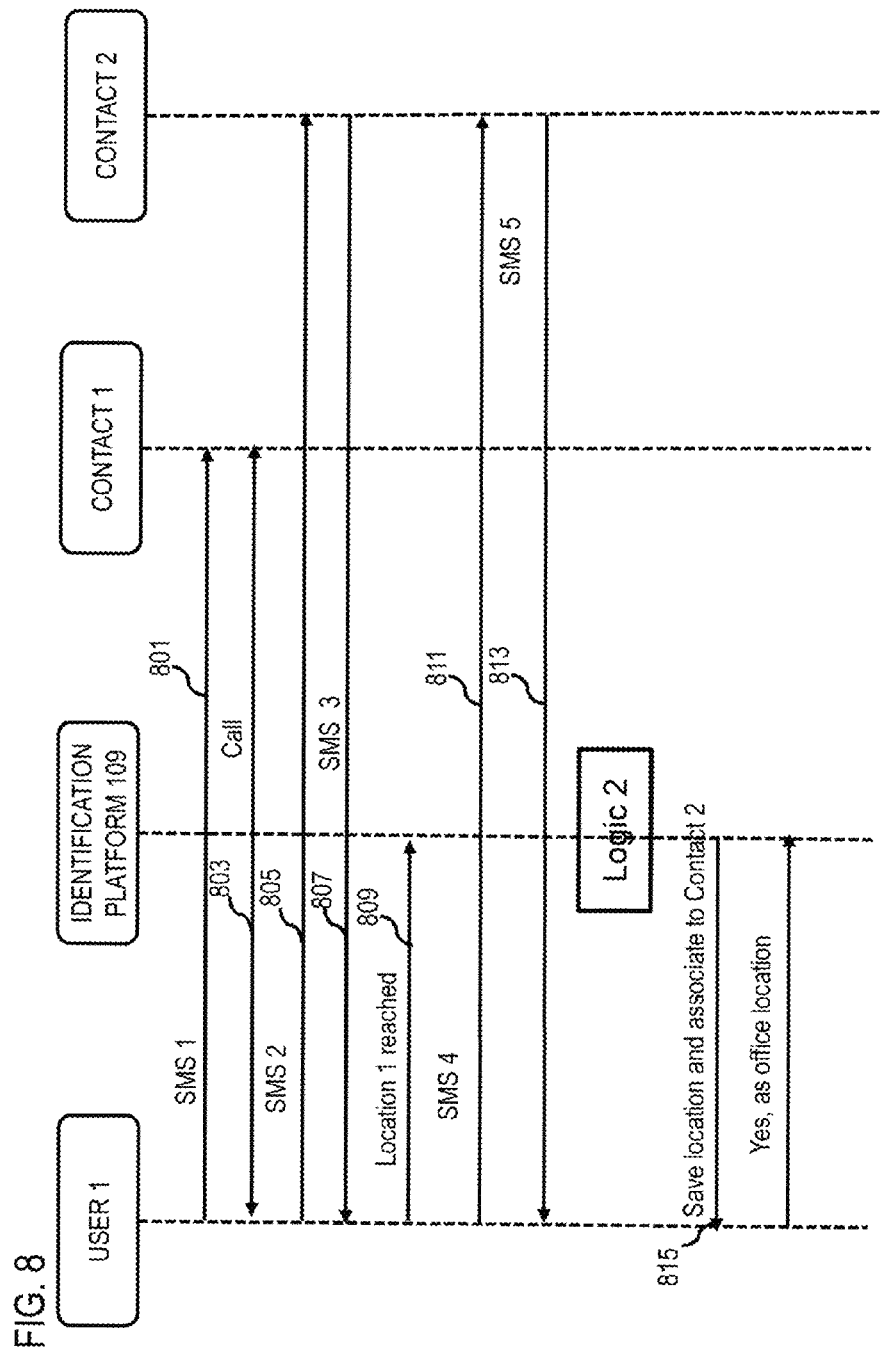

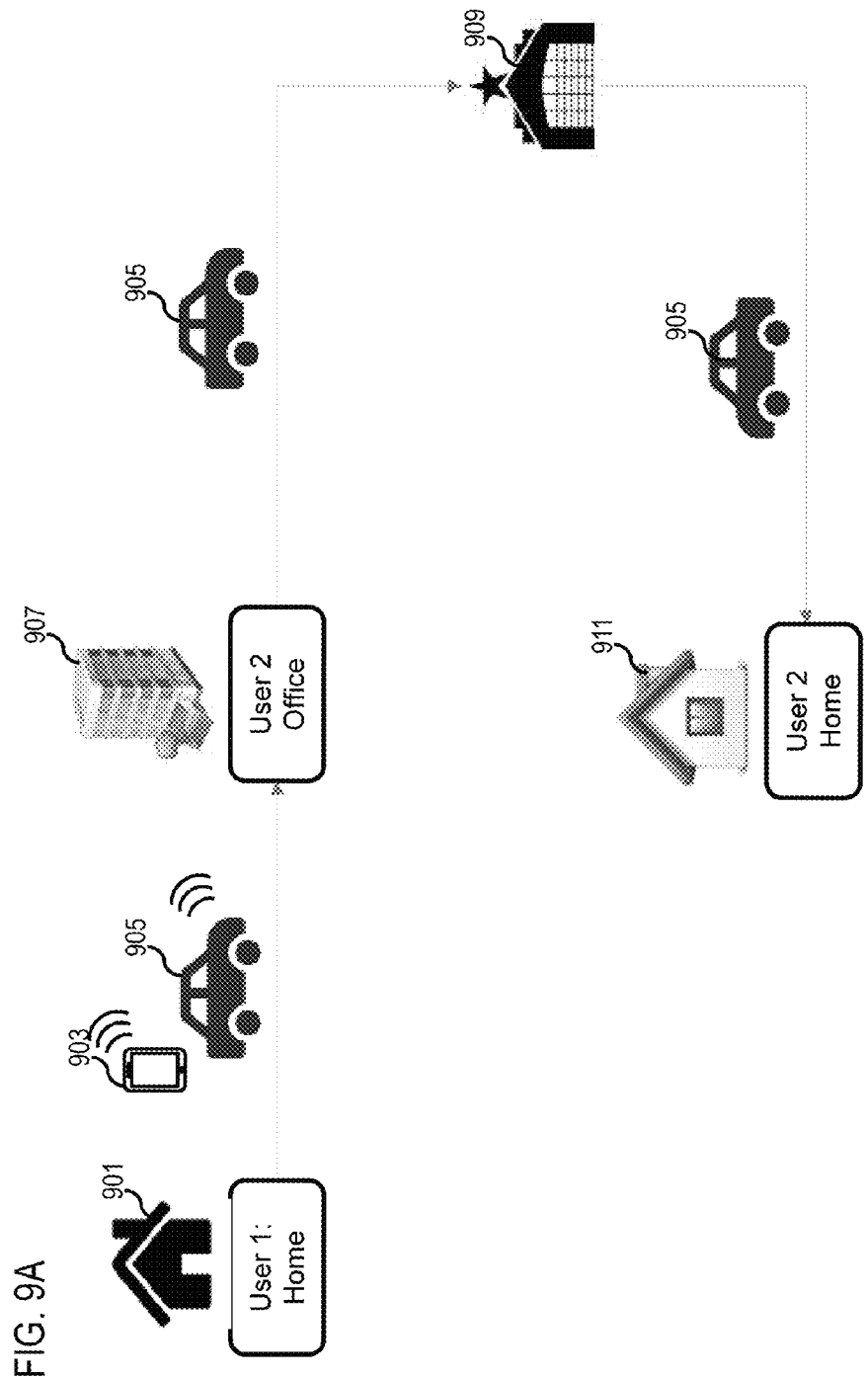

METHOD AND APPARATUS FOR PROVIDING AN ASSOCIATION BETWEEN A LOCATION AND A USER

BACKGROUND

Service providers and device manufacturers (e.g., wireless, cellular, etc.) are continually challenged to deliver value and convenience to consumers by, for example, providing compelling network services. One area of interest has been recommending location updates to users for their contacts based on communication content, contextual information and sensor information. However, service providers encounter difficulties while simplifying the task of updating location information for a contact by changing the typical user triggered interaction to a machine triggered system with location-contact mapping.

SOME EXAMPLE EMBODIMENTS

Therefore, there is a need for an approach for assigning at least one location to at least one contact associated with at least one device and/or at least one vehicle.

According to one embodiment, a method comprises monitoring at least one device, one or more communications between at least one user and at least one contact of the at least one user. The method also comprises processing and/or facilitating a processing of sensor information associated with the at least one device, the at least one user, the at least one contact, or a combination thereof to determine location information. The method further comprises updating or recommending an update of at least one contact record for the at least one contact based, at least in part, on the location information.

According to another embodiment, an apparatus comprises at least one processor, and at least one memory including computer program code for one or more computer programs, the at least one memory and the computer program code configured to, with the at least one processor, cause, at least in part, the apparatus to monitor at least one device, one or more communications between at least one user and at least one contact of the at least one user. The apparatus is also caused to process and/or facilitate a processing of sensor information associated with the at least one device, the at least one user, the at least one contact, or a combination thereof to determine location information. The apparatus is further caused to update or recommend an update of at least one contact record for the at least one contact based, at least in part, on the location information.

According to another embodiment, a computer-readable storage medium carries one or more sequences of one or more instructions which, when executed by one or more processors, cause, at least in part, an apparatus to monitor at least one device, one or more communications between at least one user and at least one contact of the at least one user. The apparatus is also caused to process and/or facilitate a processing of sensor information associated with the at least one device, the at least one user, the at least one contact, or a combination thereof to determine location information. The apparatus is further caused to update or recommend an update of at least one contact record for the at least one contact based, at least in part, on the location information.

According to another embodiment, an apparatus comprises means for monitoring at least one device, one or more communications between at least one user and at least one contact of the at least one user. The apparatus also comprises means for processing and/or facilitating a processing of sensor information associated with the at least one device, the at least one user, the at least one contact, or a combination thereof to determine location information. The apparatus further comprises means for updating or recommending an update of at least one contact record for the at least one contact based, at least in part, on the location information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for updating or recommending an update of location information for at least one contact of the at least one user, according to one example embodiment;

FIG. 4 is a flowchart of a process for determining potential contacts and ranking or filtering the potential contacts, according to one example embodiment;

FIG. 5 is a flowchart of a process for determining and/or updating and/or recommending location information based, at least in part, on user activities, according to one example embodiment;

FIG. 6 is a flowchart of a process for confirming and/or refining location information, according to one example embodiment;

FIG. 7 is a ladder diagram utilized in the process of determining at least one user to assign at least one location based on communication content, according to one example embodiment;

FIG. 8 is a ladder diagram utilized in the process of determining at least one user to assign at least one location based on communication meta-data, according to one example embodiment;

FIG. 9A is a diagram that represents a scenario wherein the identification platform 109 recognizes and assigns a location to at least one user based on communication meta-data and/or communication content and/or user movement, according to one example embodiment;

DESCRIPTION OF SOME EMBODIMENTS

Examples of a method, apparatus, and computer program for assigning at least one location to at least one contact associated with at least one device and/or at least one vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of assigning at least one location to at least one contact associated with at least one device and/or at least one vehicle, according to one embodiment. Presently, users are required to manually enter (i.e., typing or voice commands) address information for one or more contacts. Despite this process is fairly simple, users consider it to be cumbersome and are not interested in doing it. Since the existing method is a straightforward command initiated approach by the users, many users forget to perform those actions at the moments it should have been done. As a result, the task accumulates and ends of being cumbersome. Hence, there is a need for a process that alerts users at the right time to associate an address with a contact, so that users never have to manually enter a contact's full address.

To address this problem, a system 100 of FIG. 1 introduces the capability to recommend assignment of locations to one or more contacts in a mobile device through sensors analysis and context determination. In one scenario, the system 100 makes it easy for users to have addresses associated to contacts in their phone by making them more contextual, i.e., happening at the most relevant moment and device triggered, not user triggered. The system 100 enables a user to provide an input, such as, "drive to contact ABC from my phonebook" rather than providing specific location information, needless to mention location information can be lengthy and complicated. System 100 prevents users from manually typing addresses for their phonebook contacts as they are prompted to approve the association between a contact and a location when contextually relevant. System 100 promotes driver safety by preventing users from complex typing while driving.

Figure 1A:
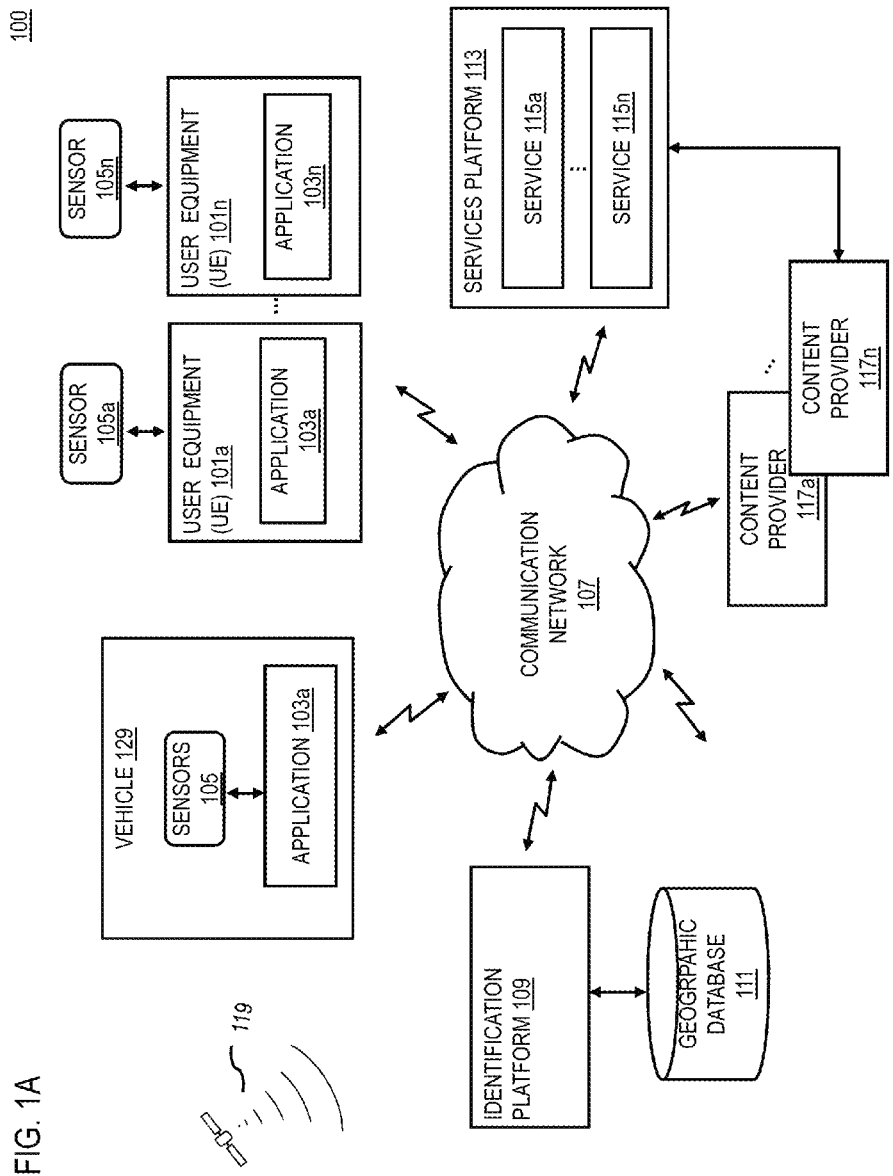
FIG. 1A is a diagram of a system capable of assigning at least one location to at least one contact associated with at least one device and/or at least one vehicle, according to one example embodiment.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to an identification platform 109 via a communication network 107, e.g., a wireless communication network. In one embodiment, the identification platform 109 performs one or more functions associated with assigning at least one location to at least one contact associated with at least one device and/or at least one vehicle.

As shown in FIG. 1A, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof.

The UE 101 may further include applications 103. Further, the applications 103 may include various applications such as, but not restricted to, location-based service application, navigation application, content provisioning application, camera/imaging application, media player application, social networking application, calendar applications, multimedia application, and the like. In one embodiment, the applications 103 are installed within the UE 101. In one example embodiment, a location-based service application installed in the UE 101 enables the identification platform 109 to determine, for example, position, destination, heading, speed, context, identification, type, or any combination thereof, for one or more of the UE 101, such as vehicles. In another embodiment, the camera/imaging application installed in the UE 101 enables the identification platform 109 to determine one or more contacts. In one example embodiment, the camera/imaging application may perform face recognition of one or more users. The cameras associated with the at least one UE 101 and/or the at least one vehicle may take pictures of the one or more users. Then, the identification platform 109 may recognize the one or more users by linking the pictures to some external database (e.g., any social networking websites), thus making the association to the user easier. In a further embodiment, the applications 103 enables the identification platform 109 to process communication information and/or contextual information and/or sensor information to determine at least one location for at least one contact.

The system 100 also includes one or more sensors 105, which can be implemented, embedded or communicatively connected to the UE 101 and/or vehicle 129. The sensors 105 may be any type of sensor. In certain embodiments, the sensors 105 may include, for example, but not restricted to, a global positioning sensor for gathering location data, such as a Global Navigation Satellite System (GNSS) sensor, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data (e.g., the camera sensors may automatically capture traffic flow information and/or traffic light information for analysis purpose), and the like. In one scenario, where cellular connectivity is not available, direct communication between UE 101 and vehicle possible through Bluetooth, WI-FI or other mechanisms. In another embodiment, the sensors 105 may include light sensors, oriental sensors augmented with height sensor and acceleration sensor (e.g., an accelerometer can measure acceleration and can be used to determine orientation of the UE 101), tilt sensors, e.g. gyroscopes, to detect the degree of incline or decline of the vehicle along a path of travel, an electronic compass to detect a compass direction, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, road condition, traffic information, or a combination thereof. In one example embodiment, the UE 101 may include Global Positioning System (GPS) receivers to obtain geographic coordinates from satellites 119 for determining current location and time associated with the UE 101. Further, the location can be determined by an Assisted Global Positioning (A-GPS), Cell of Origin, a wireless signal triangulation system, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle. In one example embodiment, the one or more sensors 105 in the UE 101 or vehicle 129 enable determination, for example, position, destination, speed, type and identification, or any combination thereof, for the UE 101 or vehicle 129. In another embodiment, the one or more sensors 105 enable determination the status situation in one or more road segments, such as traffic or weather. In another embodiment, the one or more sensors 105 enable determination of context of the UE 101 or vehicle 129.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the identification platform 109 may be a platform with multiple interconnected components. The identification platform 109 may include one or more servers, intelligent networking devices, computing devices, components and corresponding software for assigning at least one location to at least one contact associated with at least one device and/or at least one vehicle. In addition, it is noted that the identification platform 109 may be a separate entity of the system 100, a part of the one or more services 115a-115n (collectively referred to as services 115) of the services platform 113, or the UE 101.

In one embodiment, the identification platform 109 allows a user to intuitively assign a location to one or more contacts by monitoring the context around this user and making relevant recommendations. The identification platform 109 may implement certain triggers for recommending a user to associate an address with a person/contact in address book. In one scenario, the identification platform 109 may process communication information and/or contextual information associated with at least one device and/or at least one vehicle to determine the user is dropping off friend (e.g., Steve) at his home ABC. The identification platform 109 determines current position for at least one user and their contacts either via the car's position or via any location based device (e.g., sensors 105) being carried by the user. The car sensors detect Steve entering and/or leaving the vehicle. Subsequently, the identification platform 109 may alert the user to assign home ABC to Steve.

In one embodiment, the identification platform 109 may implement several methods to increase the likelihood of suggesting the most relevant contact(s). The identification platform 109 may monitor several parameters and show an ordered list to the user. In one scenario, the identification platform 109 may monitor meta-data of user's communications (e.g., SMS, calls, emails, etc.) to understand who the user has been recently in touch with. In another scenario, the identification platform 109 may monitor the content of those communications to be able to evaluate through a semantic analysis who the user is likely to meet and where. In one example embodiment, a user and his friend are exchanging SMS about meeting at the friend's office to go together to a concert. The identification platform 109 may process the content of the communication to identify the friend, the possible concert they might be going (via geographic database 111), etc. Then, the identification platform 109 may detect via sensors 105 that the user have reached the office location and picked his friend, whereupon the identification platform 109 may recommend the user to associate the office location with the friend. In one scenario, the recommendation may appear on the head unit interface of at least one vehicle, the mobile device interface, or a combination thereof. In this scenario, it is assumed that the mobile device and vehicle are linked via communication network 107 so that vehicle's sensor information can be used by the identification platform 109 to trigger the notification on the most relevant device for the user.

In one embodiment, the identification platform 109 may rank the one or more contacts. In one scenario, the identification platform 109 may deprioritize contacts whose addresses are already known. In another scenario, the identification platform 109 may deprioritize a user's partner or close friends because the frequency of communication with those people may not be relevant for the people/address matching (i.e., even if the user's wife has sent the last 5 SMS, this does not mean she should be suggested as the highly suggested person). Further, a user and his family members (e.g., wife, children, etc.) may share similar location information. In one scenario, the identification platform 109 makes it easy for the users to set their destination, as users are able to select a person as their destination.

In one scenario, knowing contacts' addresses may assist the identification platform 109 in determining places for meetups, e.g., for a dinner or a night out. Further, knowing the contact's addresses may influence proposed routes in some scenarios (e.g., if the user has time, he may pass by a friend and say hi). In addition, knowing the contact's addresses could be relevant information for destination prediction (e.g., if some address is associated to a person, it likely has a higher relevance).

In one embodiment, the geographic database 111 may store and manage data for one or more contacts associated with at least one device and/or at least one vehicle, mapping data, local events data (e.g., concerts), weather data, or a combination thereof. The information may be any multiple types of information that can provide means for aiding in the content provisioning and sharing process.

The services platform 113 may include any type of service. By way of example, the services platform 113 may include mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the identification platform 109 and the content provider 117 to supplement or aid in the processing of the content information. In one embodiment, the services platform 113 may be implemented or embedded in the identification platform 109 or in its functions.

By way of example, the services 115 may be an online service that reflects interests and/or activities of users. The services 115 allow users to share contact information, location information, activities information, contextual information, historical user information and interests within their individual networks, and provides for data portability. The services 115 may additionally assist in providing the identification platform 109 with information on travel plans of at least one user, activity information of at least one user, user profile information, and a variety of additional information.

The content providers 117a-117n (collectively referred to as content provider 117) may provide content to the UE 101, the vehicle 129, the identification platform 109, and the services 115 of the services platform 113. The content provided may be any type of content, such as, image content, textual content, audio content (e.g., audio notification), video content (e.g., visual notification), etc. In one embodiment, the content provider 117 may provide content that may supplement content of the applications 103, the sensors 105, or a combination thereof. In one embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. By way of example, the content provider 117 may provide content that may aid in determining current location of at least contact in real-time. In one embodiment, the content provider 117 may also store content associated with the UE 101, the identification platform 109, and the services 115 of the services platform 113. In another embodiment, the content provider 117 may manage access to a central repository of data, and offer a consistent, standard interface to data, such as, a repository of location information for one or more contacts, location information for one or more road segments, and so on. Any known or still developing methods, techniques or processes for assigning at least one location to at least one contact may be employed by the identification platform 109.

In one embodiment, the at least one or more vehicles 129 includes at least one autonomous vehicle, at least one highly-assisted driving vehicle, or a combination thereof. In one example embodiment, one or more users are riding an autonomous vehicle (i.e., a sell=driving taxi), and may dictate their travel destinations to the autonomous vehicle. The at least one user may use this opportunity to save his/her friends' destinations as their home. To do that, the at least one user may connect to the vehicle to retrieve those addresses, provided he/she has the necessary access rights (granted by the car and his/her friends).

By way of example, the UE 101, the identification platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
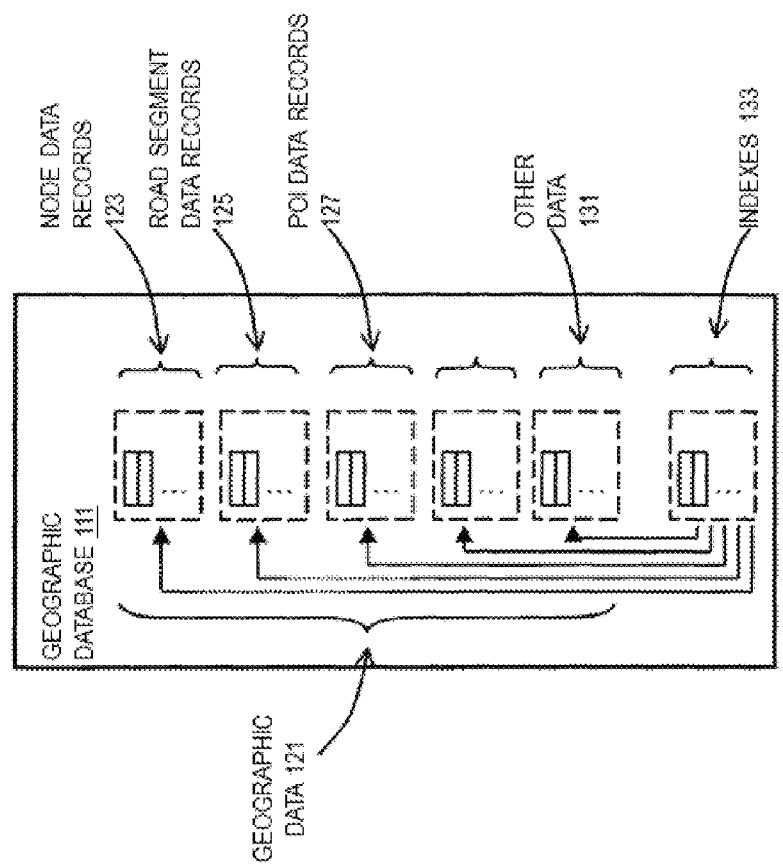
FIG. 1B is a diagram of the geographic database, according to one example embodiment.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions.

Figure 2:
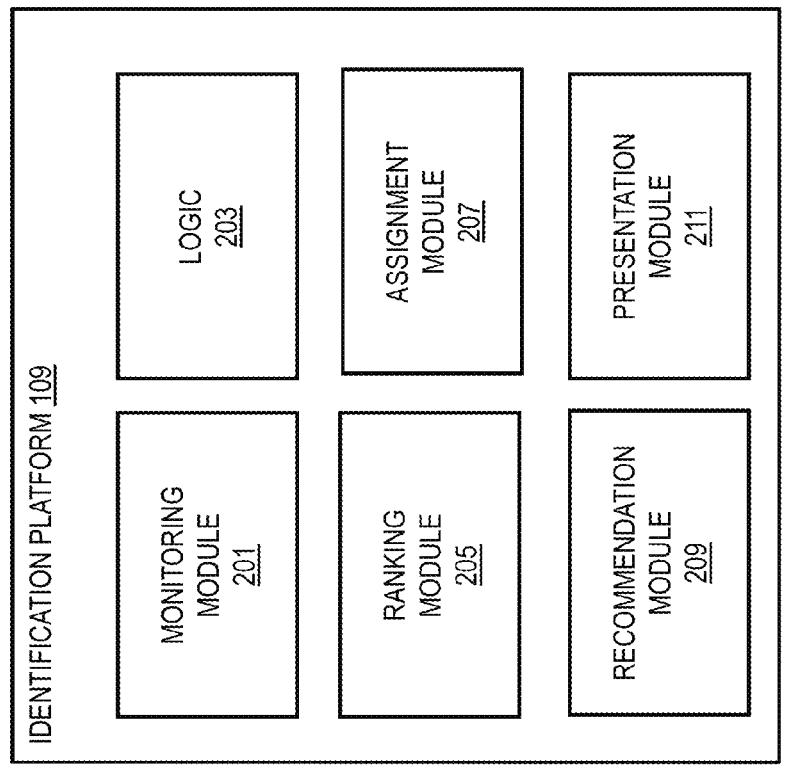
FIG. 2 is a diagram of the components of the identification platform 109, according to one example embodiment.

FIG. 2 is a diagram of the components of the identification platform 109, according to one example embodiment. By way of example, the identification platform 109 includes one or more components for assigning at least one location to at least one contact associated with at least one device and/or at least one vehicle. It is contemplated that the functions of these components may be combined in one or more components or performed by other components of equivalent functionality. In one embodiment, the identification platform 109 comprises one or more monitoring modules 201, logic 203, ranking modules 205, assignment modules 207, recommendation modules 209 and presentation modules 211, or any combination thereof.

In one embodiment, the monitoring module 201 may monitor communication information at meta-data-level and/or at semantic level to identify the at least one contact associated with the at least one device, the at least one vehicle, or a combination thereof. In another embodiment, the monitoring module 201 may monitor communication between a user and at least one contact of the at least one user to cause an association between at least one location and the contact. In a further embodiment, the monitoring module 201 may detect at least one picking-up (e.g., user entering) and/or at least one dropping-off (e.g., user leaving) of one or more contacts from the at least one vehicle via sensors 105. In another embodiment, the monitoring module 201 may determine change in location information for one or more contacts.

In one embodiment, the logic 203 may process communication information, contextual information, sensor information, or a combination thereof associated with at least one device, at least one vehicle, or a combination thereof. Then, the logic 203 may determine an association between at least one location and at least one contact associated with the at least one device, the at least one vehicle, or a combination thereof. The at least one location includes, at least in part, at least one current location, at least one destination location, at least one drop-off location, at least one pick-up location, at least one parking location, or a combination thereof. In another embodiment, the logic 203 may determine that at least one suggested location is not an actual location of the at least one contact.

In one embodiment, the ranking module 205 may rank of one or more contacts based, at least in part, on location information. In one example embodiment, the ranking module 205 may rank a contact lower amongst the other contacts if the contact already has a location assigned to it. In another embodiment, the ranking module 205 may rank one or more contacts based, at least in part, on identification information. In one example embodiment, the ranking module 205 may rank a contact lower amongst the other contacts if the contact is a family member (e.g., wife) because they may have similar location. In a further embodiment, the ranking module 205 may highly rank at least one contact with assigned location for location refinement. In one scenario, the monitoring module 201 may provide the ranking module with information on the change in location for the at least one contact, whereupon the ranking module 205 may highly rank the contact for speedy location update.

In one embodiment, the logic 203 may provide the assignment module 207 with information on association between one or more location and one or more contacts. Then, the assignment module 207 may assign at least one location to at least one contact. In another embodiment, the monitoring module 201 may provide the assignment module 207 with updated location information for at least one contact, whereupon the assignment module 207 may replace the old address with new address. In one scenario, the assignment may be based, at least in part, on user selection, confidence level, pre-set criteria, or a combination thereof. In another scenario, the identification platform 109 may constantly run in the background to try to validate the addresses in the database (e.g., phonebook) and may associate a confidence level to those addresses which varies over time. In one example embodiment, user A always goes to visit Joe at XYZ location. The nearby devices and/or communication metadata and/or sensor information indicates the XYZ location to be Joe's residential address. At this point, the identification platform 109 may determine the confidence indicator to be close to 100%. On the other hand, tier some contacts whom the user have not met for a long time, the confidence indicator may be low because the contacts living or working at that particular location has not been recently validated, in one scenario, the identification platform 109 may implement outdated location information while starting guidance. For example, a user may provide instructions to a device associated with a vehicle "Drive me to John's office". Then, the identification platform 109 may determine that John's office has not been recently validated and may notify the user "Last known office location for John was XYZ but this information is from January 2012 and has not been validated since then", Pursuant to the notification, the identification platform 109 may present the user h options, such as, would you want to:

i. Drive there?
ii. Call the associated phone number?
iii. Cancel the navigation.

In one embodiment, the recommendation module 209 may recommend at least one location to the at least one contact based, at least in part, on sensor information (e.g., proximity to the location), contextual information, or a combination thereof. In another embodiment, the recommendation module 209 may recommend at least one route, at least one meeting location, or a combination thereof based, at least in part, on the location information of one or more contacts.

In one embodiment, the presentation module 211 obtains information and/or updates from the other modules. Then, the presentation module 211 continues with generating a presentation of at least one notification for assigning the at least one location to the at least one contact. In another embodiment, the presentation module 211 may present at least one user interface for updating at least one suggested location to the at least one actual location. The user interface includes graphical user interface (GUI), and employs various application programming interfaces (APIs) or other function calls corresponding to the applications 103 of UE 101, thus enabling the display of graphics primitives such as menus, buttons, data entry fields, etc., for generating user interface elements. In one scenario, the location may be updated based, at least in part, on user interaction, wherein the one or more interactions with the at least one user interface element causes panning of the location information (e.g., street number). Further, the presentation of the at least one user interface include a list of proximate locations to the at least one suggested location. The user can select a location from the list via a touch based input and/or a voice based input.

The above presented modules and components of the identification platform 109 can be implemented in hardware, firmware, software, or a combination thereof. Though depicted as a separate entity in FIG. 1, it is contemplated that the identification platform 109 may be implemented for direct operation by respective UE 101. As such, the identification platform 109 may generate direct signal inputs by way of the operating system of the UE 101 for interacting with the applications 103. In another embodiment, one or more of the modules 201-211 may be implemented for operation by respective UEs, as the identification platform 109, or combination thereof. Still further, the identification platform 109 may be integrated for direct operation with the services 115, such as in the form of a widget or applet, in accordance with an information and/or subscriber sharing arrangement. The various executions presented herein contemplate any and all arrangements and models.

Figure 13:
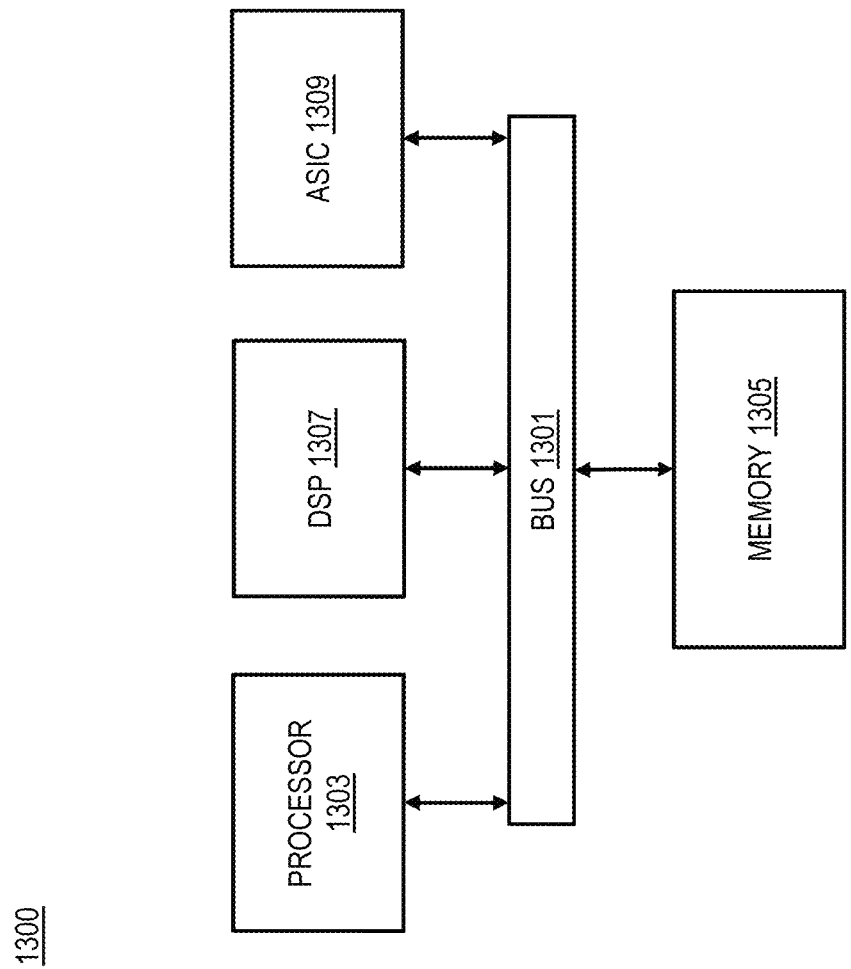
FIG. 13 is a diagram of a chip set that can be used to implement an embodiment of the invention.

FIG. 3 is a flowchart of a process for updating or recommending an update of location information for at least one contact of the at least one user, according to one example embodiment. In one embodiment, the identification platform 109 performs the process 300 and is implemented in, for instance, a chip set including a processor and a memory as shown in FIG. 13.

In step 301, the identification platform 109 may monitor at least one device, one or more communications between at least one user and at least one contact of the at least one user. In one embodiment, the monitoring of the one or more communications includes, at least in part, a meta-data analysis, a semantic analysis, or a combination thereof of the one or more communications. In one scenario, the identification platform 109 may monitor at least one users' communication in the background. The monitoring may occur at meta-data-level (who called/messaged whom, when and for how long) or at a semantic level (by extracting next actions and locations), thus determining a user's context. In one example embodiment, Rick is exchanging some emails, call and SMS with Brad about the concert they will attend on Monday. On that day, Rick calls Brad to tell him he will pick him up at his office before going to the concert. Upon arrival Rick sends an SMS to Brad. The identification platform 109 recognizes the context of a car parked and some ongoing communication channels between Rick and Brad, hence it suggests Rick to assign this location to Brad. Rick accepts and assigns it to Brad.

In step 303, the identification platform 109 may process and/or facilitate a processing of sensor information associated with the at least one device, the at least one user, the at least one contact, or a combination thereof to determine location information. In one embodiment, the sensor information is collected from one or more sensors associated with the at least one device, one or more vehicles, or a combination thereof. In one scenario, the processing of the data may take place at various locations (e.g., cloud, car, smartphone, smartwatch, any computing device with the necessary power and memory). In one example embodiment, the identification platform 109 may perform the processing in the cloud since multiple devices could report their status and upload data to the cloud. Then, the identification platform 109 may manage the storage of that data and compute the output.

In step 305, the identification platform 109 may update or recommend an update of at least one contact record for the at least one contact based, at least in part, on the location information. In one example embodiment, John is exchanging some emails, call and SMS with Mike about the concert they will attend on Tuesday. On that day, John is picking up Mike at his office before going to the concert. After arriving at the office location, John sends an SMS "I am waiting downstairs". The identification platform 109 recognizes the context of the parked vehicle and the semantics used in the SMS. As a result, the identification platform 109 suggests the user to assign this location to Mike as his office address. John can accept and assign the location to Mike. Then, they drive to the concert together. After the concert, John brings Mike home and when the car stops, Mike says bye and leaves the car. The identification platform 109 detects this change in context, and suggests assigning the location to Mike. John confirms and sets Mike Home with one click.

FIG. 4 is a flowchart of a process for determining potential contacts and ranking or filtering the potential contacts, according to one example embodiment. In one embodiment, the identification platform 109 performs the process 400 and is implemented in, for instance, a chip set including a processor and a memory as shown in FIG. 13.

In step 401, the identification platform 109 may determine one or more potential contacts based, at least in part, on the one or more communications, the sensor information, the location information, or contextual information or a combination thereof. In one example embodiment, the identification platform 109 may monitor communication between a user and his/her contacts to determine the contact the user is meeting. In one scenario, the identification platform 109 may present a ranked list of possible contacts. The identification platform 109 may apply filtering to refine the suggestion list. In another example embodiment, a user arrives at a certain location. At this point, the user may decide to More that location, whereupon he/she may select a "store location" button on the user interface of the at least one UE 101 and/or at least one vehicle. Using the same techniques described, the vehicle and/or UE 101 may offer the ranked list of suggested contacts.

In step 403, the identification platform 109 may present the one or more potential contacts to the at least one user on at least one user interface. In one embodiment, the one or more interactions in the at least in one user interface selects the at least one contact from among the one or more potential contacts. In one embodiment, the main objective is to keep an up-to-date contact list, with the addresses that matter to people. One of the important reasons to have an updated contact list is that user can issue commands to his navigation system such as "find theater's near Mark's home" instead of "find theaters near ABC 123 Street", which requires the user to know the address accurately and speak it loud and clearly. Saying Mark's home is probably less error-prone since it's shorter and easy.

In step 405, the identification platform 109 may rank or filter the one or more potential contacts based, at least in part, on one or more criteria. In one embodiment, the updating or the recommending of the update of the at least one contact record is further based, at least in part, on the ranking or the filtering. In another embodiment, the ranking, the filtering, or a combination thereof is based, at least in part, on whether the at least one contact record already includes address information for the at least one contact, on relationship information between the at least one and the at least one contact, or on a combination thereof.

FIG. 5 is a flowchart of a process for determining and/or updating and/or recommending location information based, at least in part, on user activities, according to one example embodiment. In one embodiment, the identification platform 109 performs the process 500 and is implemented in, for instance, a chip set including a processor and a memory as shown in FIG. 13.

In step 501, the identification platform 109 may process and/or facilitate a processing of the sensor information, the one or more communications, or a combination thereof to determine whether the at least one user is engaged in a passenger drop-off activity, a passenger pick-up activity, a parking activity, a contact meet-up activity, or a combination thereof. In one scenario, the sensors 105 such as car occupancy sensors (to detect pick-up/drop-off) or proximity sensors (activated when meeting a contact) determine reaching a location. In one example embodiment, the identification platform 109 may determine multiple passengers in at least one vehicle via sensors 105 (e.g., seat sensors etc.). The identification platform 109 may identify each passenger via sensors 105 (e.g., device identifier, subscription information, IMEI, etc.). Then, once the driver drops at least one passenger at a particular location (e.g., GPS sensors etc.), the identification platform 109 may suggest to associate the location to at least one leaving passenger. Further, the identification platform 109 may provide ranking (i.e., suggest those contacts at the top of the ranked list) for the one or more passengers in at least one vehicle. Any additional parameters detected via sensors 105 may help in finding out which passenger left the car, then it should be used to fine tune the ranking. For example, the identification platform 109 may detect that the person leaving was the only woman in the car (via voice detection sensors when saying goodbye) or via the phones paired with the car, etc.

In step 503, the identification platform 109 may initiate the determining of the location information, the updating of the at least one contact record, the recommending of the update of the at least one contact record, or a combination thereof based, at least in part, on the passenger drop-off activity, the passenger pick-up activity, the parking activity, the contact meet-up activity, or a combination thereof. In one example embodiment, the identification platform 109 may determine at least one user dropping off at least one passenger. Then, the identification platform 109 may present a notification message with the following content:

1. Do you want to assign this address "Main Street 24" to a phonebook's contact? User selects "Yes."
2. Pick the desired contact below:
    Joe
    Mike
    Fred
    No, Cancel.

Further, the identification platform 109 may provide the user with an option to refine the address if the at least one vehicle is not parked exactly at his friend's home address. In another example embodiment, the identification platform 109 may determine at least one user is waiting for someone in his car (e.g., context of a parked vehicle) or on foot. Then, the identification platform 109 may suggest assigning the location to a person though the algorithm has not accurately determined which person to assign to. Since the user has time while waiting, he/she could simply pick a contact from his/her phonebook without having to type anything.

FIG. 6 is a flowchart of a process for confirming and/or refining location information, according to one example embodiment. In one embodiment, the identification platform 109 performs the process 600 and is implemented in, for instance, a chip set including a processor and a memory as shown in FIG. 13.

In step 601, the identification platform 109 may present the at least one user interface to the at least one user for confirming, refining, or a combination thereof of the location information. In one embodiment, the updating of the at least one contact record, the recommending of the updating of the at least one contact record, or a combination thereof is based, at least in part, on the confirming, the refining, or a combination thereof. In one example embodiment, the at least one suggested address may not be the correct address. For instance, the car is not parked in front of the house or the contact lives in a pedestrian area or the pedestrian entrance is different from the car entrance, and so on. Hence, the identification platform 109 allows a user to manually change the address by manually modifying the location information (e.g., editing the street number, street name or picking a nearby location on the map). The user may be able to add extra details if he/she wishes (e.g., floor number, apartment number). The identification platform 109 offers a dedicated interface making this operation easy, with close zoom level, visible street names and numbers.

In step 603, the identification platform 109 may process and/or facilitate a processing of the location information, the one or more communications, the sensor information, contextual information, or a combination thereof to determine one or more location refinement options. In one embodiment, the one or more refinement options include, at least in part, one or more alternate addresses or one or more alternate components of the one or more alternate addresses. In one example embodiment, a user drops off his friend at ABC location, but the friend actually works at XYZ location. The identification platform 109 may suggest ABC location as the potential office location but will also suggest a list of nearby streets including XYZ Street as refinement options. In one scenario, a user may have previously entered address for at least one contact, but the contact has changed his/her location. Then, the identification platform 109 may generate suggestions on whom to assign a location from the contact list. In one example embodiment, the identification platform 109 may rank some users low if they already have address assigned to them. In another example embodiment, the identification platform 109 may rank a contact higher if the presence of the contact is detected in the vehicle, or if the user had recent interactions with a contact, as this make him/her a more likely candidate for the address association. In one scenario, location information (e.g., from GPS) can be reverse geo-coded, giving an address to match a possible contact. The user can confirm that the address matches the contact with a single OK (or refine the address with minor typing). The refinement can also be done in the form of tagging address is home or work, etc.). Such information can be detected by analysis at semantic level.

In step 605, the identification platform 109 may present one or more refinement options in the at least one user interface. In one example embodiment, the identification platform 109 may present a list of alternative addresses (e.g., a list of the closest streets). Then, the user may change the suggested address by selecting one of the alternative addresses. Further, the presentation module 211 provides GUIs that allows users to manually change the street number and/or street name. Thereby easing the process of refining addresses for at least one user.

FIG. 7 is a ladder diagram utilized in the process of determining at least one user to assign at least one location based on communication content, according to one example embodiment. In one embodiment, the identification platform 109 may monitor communication content between users and their contacts, including location updates, relevant sensor information, or a combination thereof. In one scenario, user 1 sends an SMS via his/her UE 101 to the UE 101 of contact 1 (step 701). Then, contact 1 sends a response to user 1 via his/her UE 101 (step 703). User 1 also has telephone and/or SMS conversation with contact 2 via their respective UE 101s (steps 705, 707 and 709). Pursuant to the communication user 1 reaches a specific location (step 711), whereupon user 1 communicates with contact 1 via SMS (step 713). The identification platform 109 constantly monitors communication content between user 1 and his/her contacts. The identification platform 109 may analyze the text from user 1 to contact 1 that "he/she is coming to pick contact 1 at the office." The identification platform 109 may determine that user 1 has reached the office location of contact 1 based on sensor information received from sensor 105. Further, SMS from user 1 "I am waiting outside" and response SMS from contact 1 that "ok, I come down in 3 minutes" (step 715) increases the confidence level, and the identification platform 109 may recommend an assignment of the current location as the office location of contact 1 instead of contact 2 (step 717). In such manner, the identification platform 109 performs semantic analysis to select at least one contact from a group of contacts to assign a location.

FIG. 8 is a ladder diagram utilized in the process of determining at least one user to assign at least one location based on communication meta-data, according to one example embodiment. In one embodiment, the identification platform 109 may monitor user's communication meta-data, location updates, relevant sensors' information, temporal information, or a combination thereof. In one scenario, when user 1 interacts with contact 1 and contact 2 over a communication network, the content of the communication is not the only information that is exchanged. User 1 also sends data about the communication that allows the communication to successfully reach its intended recipients. The data about the communication may include sender's location, sender's UE 101 identifier (e.g., subscription information, IMEI, etc.), recipients location, recipients UE 101 identifier, and so on. In one example embodiment, user 1 may communicate with contact 1 via SMS and telephone call (steps 801 and 803). User 1 may also communicate with contact 1 via SMS (steps 805 and 807). Pursuant to the communication user 1 reaches a specific location (step 809), whereupon user 1 communicates with contact 2 via SMS (step 811 and 813). The identification platform 109 detects that users 1 communicates with contact 2 upon arrival at the new location, such context detection may cause the identification platform 109 to suggest the new location to contact 2 (step 815). Further, the identification platform 109 may suggest user 1 to save the current address to the most likely contact based, at least in part, on pre-set criteria (i.e., communication meta-data, location updates, and relevant sensor information) and existing information in the cloud and UE 101. In another example embodiment, the identification platform 109 may recognize contact 2 as user 1's wife, whereupon the identification platform 109 may implement light filtering to de-prioritize contact 2 since it already has location (e.g., residential address, official address) assigned to it.

FIG. 9A is a diagram that represents a scenario wherein the identification platform 109 recognizes and assigns a location to at least one user based on communication meta-data and/or communication content and/or user movement, according to one example embodiment. In one scenario, user 1 travels from his home 901 towards user 2's location 907. The identification platform 109 receives location information of user 1 from sensor 105 associated with device 903 and vehicle 905. In addition, the identification platform 109 may monitor the meta-data of user's communications and/or the content of those communications to determine whom user 1 is likely to meet and where. The identification platform 109 determines that user 1 and user 2 are exchanging SMS about meeting at user 2's office to go a concert together. The identification platform 109 may detect proximity between the mobile devices of user 1 and user 2 to determine that user 2 has been picked-up at location 907. Then, the identification platform 109 may cause a presentation of a notification in device 903 of user 1 for assigning location 907 as the office of user 2. The identification platform 109 also detects via sensor 105 (e.g., context of parked vehicle 905 at the concert location) that user 1 and user 2 are at the concert location 909. Then, user 1 drops-off user 2 at location 911. The identification platform 109 may consider the time factor (e.g., nighttime) and may cause a presentation of a notification in device 903 of user 1 for assigning location 907 as the home of user 2.

Figure 9B:
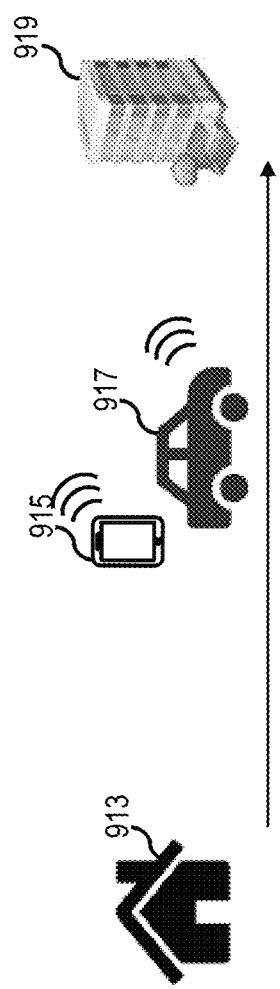
FIG. 9B is a diagram that represents a scenario wherein at least one user is advised to update contact record based, at least in part, on drop-off activity, pick-up activity, meeting-activity, or a combination thereof.

FIG. 9B is a diagram that represents a scenario wherein at least one user is advised to update contact record based, at least in part, on drop-off activity, pick-up activity, meeting-activity, or a combination thereof. In one example embodiment, user 1 travels from his home 913 towards user 2's location 919. The identification platform 109 may determine user 1 picking-up user 2 from location 919. Then, the identification platform 109 may present a notification message to the user's UE 101 915 and/or vehicle 917 with the following content:
  1. Do you want to assign this address "Main Street 24" to a phonebook's contact? User 1 selects "Yes."
  2. Pick the desired contact below:
    Albert
    Pete
    Frank
    No, Cancel.

Figure 10:
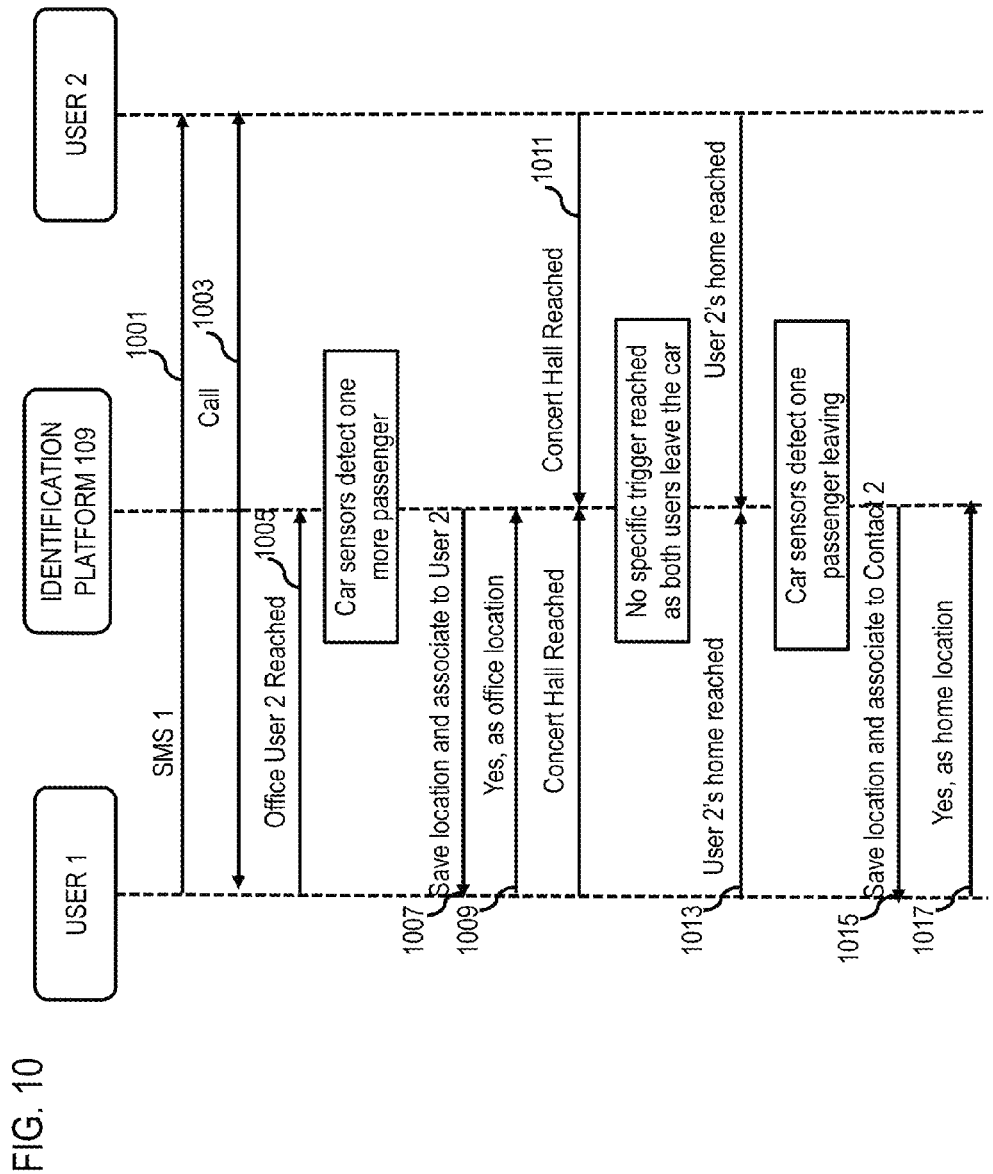
FIG. 10 is a ladder diagram utilized in the process of identifying and assigning a location to at least one user based on communication meta-data and/or communication content, according to one example embodiment.

FIG. 10 is a ladder diagram utilized in the process of identifying and assigning a location to at least one user based on communication meta-data and/or communication content, according to one example embodiment. In one scenario, user 1 sends an SMS via his/her UE 101 to the UE 101 of user 2 (step 1001). Then, user 1 and user 2 have telephone conversation via their respective UE 101s (step 1003). The identification platform 109 may monitor the meta-data of user's communications and/or the content of those communications to determine that user 1 and user 2 are meeting at user 2's office to go a concert together. Pursuant to the conversation user 1 reaches the office location of user 2 (step 1005). The car sensors detect an entry of at least one additional passenger (i.e., user 2). Then, the identification platform 109 saves the office location and notifies user 1 to associate the office location with user 2 (step 1007). Then, user 1 may approve the association between the office location and user 2 (step 1009). The identification platform 109 detects via sensor 105 (e.g., context of parked vehicle at the concert location) that user 1 and user 2 are at the concert location (step 1011). The identification platform 109 may not reach any specific triggers as the car sensors detect both the users leaving the vehicle for a certain time period. Afterward, user 1 drops-off user 2 at her home (step 1013). The car sensors may detect that the passenger is leaving, whereupon the identification platform 109 may save the location (step 1015) and notify user 1 to assign the location as the home of user 2. Then, user 1 may approve the association between the home location and user 2 (step 1017).

Figure 11:
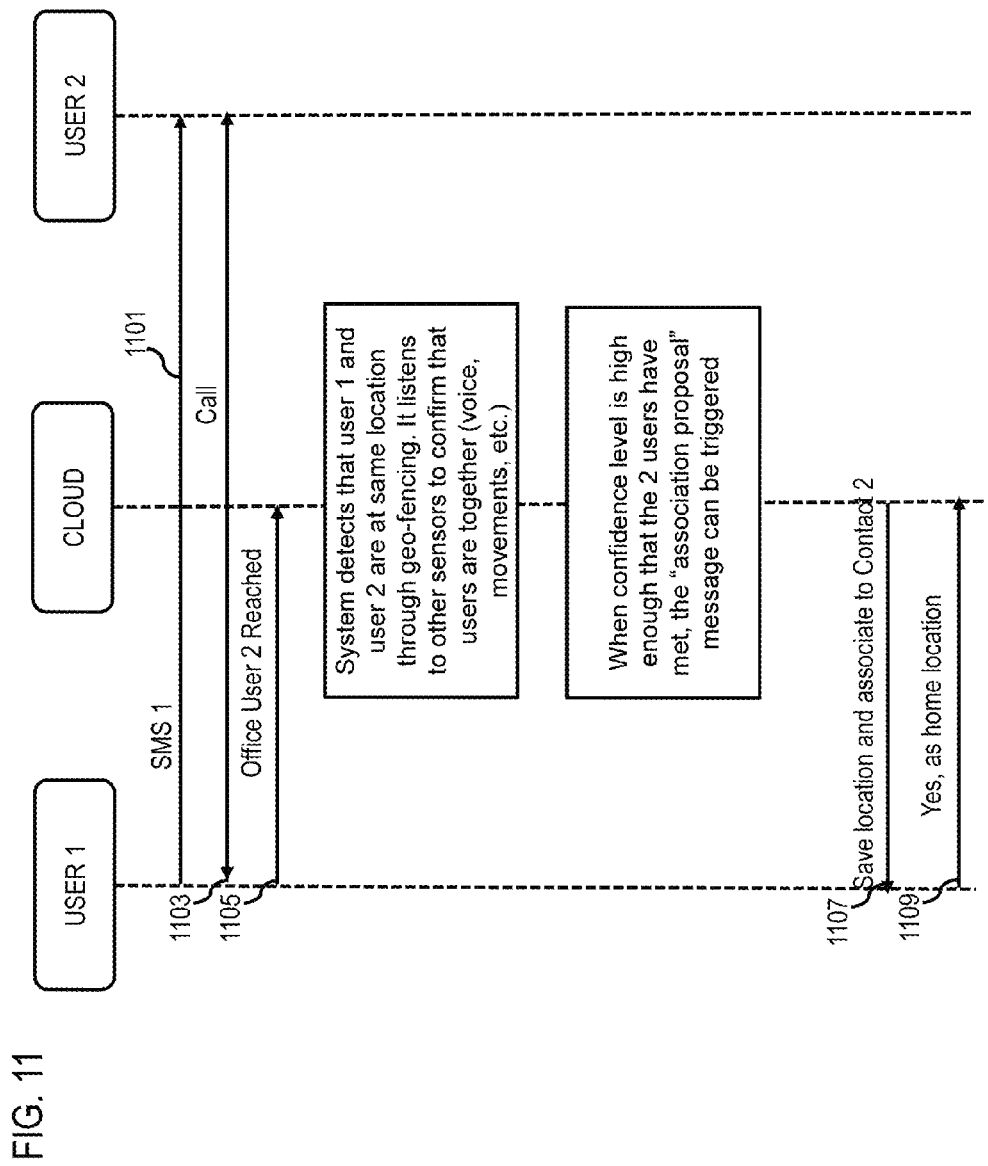
FIG. 11 is a ladder diagram utilized in the process of determining and assigning at least one location to at least one pedestrian user, according to one example embodiment.

FIG. 11 is a ladder diagram utilized in the process of determining and assigning at least one location to at least one pedestrian user, according to one example embodiment. In such scenarios, the context may be detected via UE 101 handshake, UE 101 proximity detection, voice recognition (e.g., users greeting each other), and so on. In one scenario, user 1 sends an SMS via his/her UE 101 to the UE 101 of user 2 (step 1101). Then, user 1 and user 2 have telephone conversation via their respective UE 101s (step 1103). Pursuant to the conversation user 1 walks to the office location of user 2 (step 1105). The identification platform 109 may detect that the users are at the same location through geo-fencing. Further, the identification platform 109 may listen to other sensors to confirm that the users are together (e.g., voice, movements, etc.). Then, the identification platform 109 may trigger an association proposal message to user 1 based on the confidence level that the users have met. If the confidence level is high the identification platform 109 may save the location and may notify user 1 to associate the location to contact 2 (step 1107). Then, user 1 may approve the association between the office location and user 2 (step 1109).

The processes described herein for assigning at least one location to at least one contact associated with at least one device and/or at least one vehicle may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
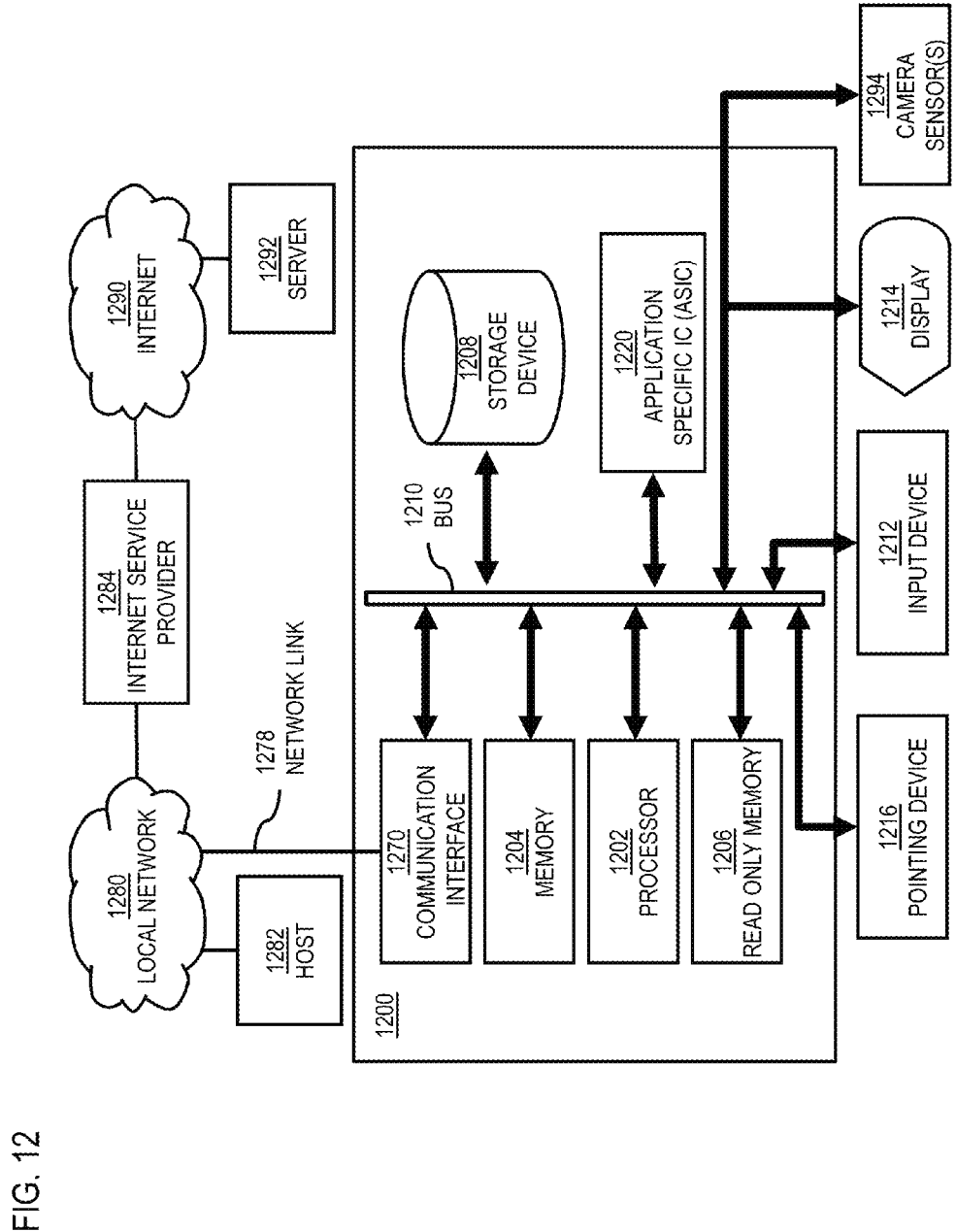
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to assign at least one location to at least one contact associated with at least one device and/or at least one vehicle as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of assigning at least one location to at least one contact associated with at least one device and/or at least one vehicle.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to assign at least one location to at least one contact associated with at least one device and/or at least one vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for assigning at least one location to at least one contact associated with at least one device and/or at least one vehicle. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for assigning at least one location to at least one contact associated with at least one device and/or at least one vehicle, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for assigning at least one location to at least one contact associated with at least one device and/or at least one vehicle to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to assign at least one location to at least one contact associated with at least one device and/or at least one vehicle as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of assigning at least one location to at least one contact associated with at least one device and/or at least one vehicle.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to assign at least one location to at least one contact associated with at least one device and/or at least one vehicle. The memory 1305 also stores the data associated with or generated by the execution of the inventive steps.

Figure 14:
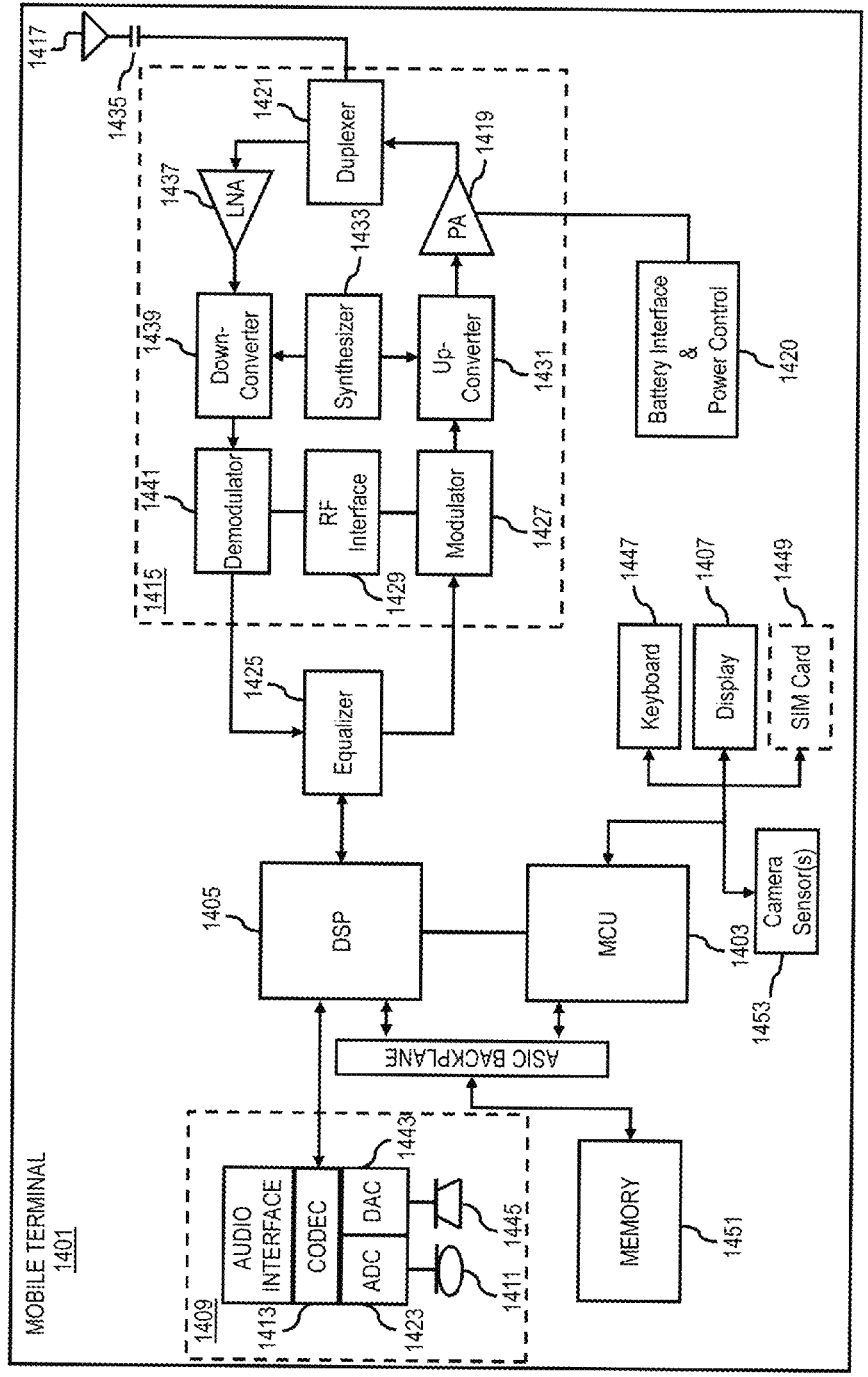
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of assigning at least one location to at least one contact associated with at least one device and/or at least one vehicle. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of assigning at least one location to at least one contact associated with at least one device and/or at least one vehicle. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WI-FI), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to assign at least one location to at least one contact associated with at least one device and/or at least one vehicle. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   monitoring at least one device, one or more communications between at least one user and at least one contact of the at least one user;
   performing a meta-data analysis, a semantic analysis, or a combination thereof of the one or more communications via at least one processor associated with the at least one device;
   processing and/or facilitating a processing of sensor information collected from one or more global positioning system sensors associated with the at least one device, at least one vehicle, or a combination thereof to determine location information of the at least one user, the at least one contact, or a combination thereof; and
   updating or recommending an update of at least one contact record for the at least one contact based, at least in part, on the meta-data analysis, the semantic analysis, the location information, or a combination thereof.

2. A method of claim 1, further comprising:
   determining one or more potential contacts based, at least in part, on the one or more communications, the sensor information, the location information, or contextual information or a combination thereof; and
   presenting the one or more potential contacts to the at least one user on at least one user interface of the at least one device,
   wherein one or more interactions in the at least in-one user interface selects the at least one contact from among the one or more potential contacts.

3. A method of claim 2, further comprising:
   ranking or filtering the one or more potential contacts based, at least in part, on one or more criteria,
   wherein the updating or the recommending of the update of the at least one contact record is further based, at least in part, on the ranking or the filtering.

4. A method of claim 3, wherein the ranking, the filtering, or a combination thereof is based, at least in part, on whether the at least one contact record already includes address information for the at least one contact, on relationship information between the at least one user and the at least one contact, or a combination thereof.

5. A method of claim 2, further comprising:
   determining a waiting period for the at least one user, the at least one contact, or a combination thereof based, at least in part, on a time threshold value; and
   requesting an assignment of at least one location to the at least one contact during the waiting period,
   wherein the at least one user selects the at least one contact from among the one or more potential contacts for the at least one location.

6. A method of claim 1, further comprising:
   processing and/or facilitating a processing of the sensor information, the one or more communications, or a combination thereof to determine whether the at least one user is engaged in a passenger drop-off activity, a passenger pick-up activity, a parking activity, a contact meet-up activity, or a combination thereof; and
   initiating the determining of the location information, the updating of the at least one contact record, the recommending of the update of the at least one contact record, or a combination thereof based, at least in part, on the passenger drop-off activity, the passenger pick-up activity, the parking activity, the contact meet-up activity, or a combination thereof.

7. A method of claim 6, further comprising:
   identifying the at least one contact from one or more passengers in the at least one vehicle based, at least in part, on the sensor information detected via one or more sensors associated with the at least one device, the at least one vehicle, or a combination thereof; and
   associating the location information with the at least one contact based, at least in part, on the passenger drop-off activity, the passenger pick-up activity, the parking activity, the contact meet-up activity, or a combination thereof.

8. A method of claim 1, further comprising:
   presenting the at least one user interface to the at least one user for confirming, refining, or a combination thereof of the location information,
   wherein the updating of the at least one contact record, the recommending of the updating of the at least one contact record, or a combination thereof is based, at least in part, on the confirming, the refining, or a combination thereof.

9. A method of claim 8, further comprising:
   processing and/or facilitating a processing of the location information, the one or more communications, the sensor information, contextual information, or a combination thereof to determine one or more location refinement options; and presenting the one or more refinement options in the at least one user interface.

10. A method of claim 9, wherein the one or more refinement options include, at least in part, one or more alternate addresses or one or more alternate components of the one or more alternate addresses.

11. An apparatus comprising:
at least one processor; and
at least one memory including computer program code for one or more programs,
the at least one memory and the computer program code configured to, with the at least one processor, cause the apparatus to perform at least the following,
monitor at least one device, one or more communications between at least one user and at least one contact of the at least one user;
perform a meta-data analysis, a semantic analysis, or a combination thereof of the one or more communications via at least one processor associated with the at least one device;
process and/or facilitate a processing of sensor information collected from one or more global positioning system sensors associated with the at least one device, at least one vehicle, or a combination thereof to determine location information of the at least one user, the at least one contact, or a combination thereof; and
update or recommend an update of at least one contact record for the at least one contact based, at least in part, on the meta-data analysis, the semantic analysis, the location information, or a combination thereof.

12. An apparatus of claim 11, wherein the apparatus is further caused to:
determine one or more potential contacts based, at least in part, on the one or more communications, the sensor information, the location information, or contextual information or a combination thereof; and
present the one or more potential contacts to the at least one user on at least one user interface of the at least one device,
wherein one or more interactions in the at least one user interface selects the at least one contact from among the one or more potential contacts.

13. An apparatus of claim 12, wherein the apparatus is further caused to:
rank or filter the one or more potential contacts based, at least in part, on one or more criteria,
wherein the updating or the recommending of the update of the at least one contact record is further based, at least in part, on the ranking or the filtering.

14. An apparatus of claim 13, wherein the ranking, the filtering, or a combination thereof is based, at least in part, on whether the at least one contact record already includes address information for the at least one contact, on relationship information between the at least one user and the at least one contact, or a combination thereof.

15. An apparatus of claim 11, wherein the apparatus is further caused to:
process and/or facilitate a processing of the sensor information, the one or more communications, or a combination thereof to determine whether the at least one user is engaged in a passenger drop-off activity, a passenger pick-up activity, a parking activity, a contact meet-up activity, or a combination thereof; and
initiate the determining of the location information, the updating of the at least one contact record, the recommending of the update of the at least one contact record, or a combination thereof based, at least in part, on the passenger drop-off activity, the passenger pick-up activity, the parking activity, the contact meet-up activity, or a combination thereof.

16. An apparatus of claim 15, further comprising:
identify the at least one contact from one or more passengers in the at least one vehicle based, at least in part, on the sensor information detected via one or more sensors associated with the at least one device, the at least one vehicle, or a combination thereof; and
associate the location information with the at least one contact based, at least in part, on the passenger drop-off activity, the passenger pick-up activity, the parking activity, the contact meet-up activity, or a combination thereof.

17. An apparatus of claim 11, wherein the apparatus is further caused to:
present the at least one user interface to the at least one user for confirming, refining, or a combination thereof of the location information,
wherein the updating of the at least one contact record, the recommending of the updating of the at least one contact record, or a combination thereof is based, at least in part, on the confirming, the refining, or a combination thereof.

18. A non-transitory computer-readable storage medium carrying one or more sequences of one or more instructions which, when executed by one or more processors, cause an apparatus to at least perform the following steps:
monitoring at least one device, one or more communications between at least one user and at least one contact of the at least one user;
performing a meta-data analysis, a semantic analysis, or a combination thereof of the one or more communications via at least one processor associated with the at least one device;
processing and/or facilitating a processing of sensor information collected from one or more global positioning system sensors associated with the at least one device, at least one vehicle, or a combination thereof to determine location information of the at least one user, the at least one contact, or a combination thereof; and
updating or recommending an update of at least one contact record for the at least one contact based, at least in part, on the meta-data analysis, the semantic analysis, the location information, or a combination thereof.

19. A non-transitory computer-readable storage medium of claim 18, wherein the apparatus is further caused to:
determining one or more potential contacts based, at least in part, on the one or more communications, the sensor information, the location information, or contextual information or a combination thereof; and
presenting the one or more potential contacts to the at least one user on at least one user interface of the at least one device,
wherein one or more interactions in the at least one user interface selects the at least one contact from among the one or more potential contacts.

20. A non-transitory computer-readable storage medium of claim 18, wherein the apparatus is further caused to:
ranking or filtering the one or more potential contacts based, at least in part, on one or more criteria,
wherein the updating or the recommending of the update of the at least one contact record is further based, at least in part, on the ranking or the filtering.

* * * * *